US012629914B2

(12) United States Patent
Van Schalkwyk et al.

(10) Patent No.: US 12,629,914 B2
(45) Date of Patent: May 19, 2026

(54) IMPACT PROTECTIVE COMPOSITE MATERIAL

(71) Applicant: IMPORT KALEIDOSCOPE CC, Pretoria (ZA)

(72) Inventors: Marius Wilken Van Schalkwyk, Pretoria (ZA); Hendrik Petrus Naudé, Pretoria (ZA)

(73) Assignee: KALEIDOSCOPE TECH (PTY) LTD, Pretoria (ZA)

( * ) Notice: Subject to any disclaimer, the term of this patent is extended or adjusted under 35 U.S.C. 154(b) by 233 days.

(21) Appl. No.: 18/249,609

(22) PCT Filed: Jun. 25, 2021

(86) PCT No.: PCT/IB2021/055665
§ 371 (c)(1),
(2) Date: Apr. 19, 2023

(87) PCT Pub. No.: WO2022/084758
PCT Pub. Date: Apr. 28, 2022

(65) Prior Publication Data
US 2023/0391046 A1 Dec. 7, 2023

(30) Foreign Application Priority Data
Oct. 19, 2020 (ZA) ................................. 2020/06465

(51) Int. Cl.
*B32B 5/02* (2006.01)
*A41D 31/24* (2019.01)
(Continued)

(52) U.S. Cl.
CPC ................ *B32B 5/028* (2013.01); *B32B 3/04* (2013.01); *B32B 5/18* (2013.01); *B32B 27/065* (2013.01); *B32B 27/32* (2013.01); *B32B 2250/05* (2013.01); *B32B 2305/022* (2013.01); *B32B 2305/18* (2013.01); *B32B 2307/546* (2013.01); *B32B 2307/7376* (2023.05); *B32B 2571/02* (2013.01)

(58) Field of Classification Search
CPC ......... B32B 5/024; B32B 5/022; B32B 5/028; B32B 5/26; B32B 5/245; B32B 2306/022; B32B 2305/18; B32B 2571/02; B32B 5/25; F41H 5/0471; F41H 5/0478; F41H 5/0485; A41D 31/245
See application file for complete search history.

(56) References Cited

U.S. PATENT DOCUMENTS 3,813,281 A * 5/1974 Burgess et al. ....... B32B 15/046
428/101
7,608,322 B2 * 10/2009 Thurau .................... F41H 5/04
428/297.1
(Continued)

*Primary Examiner* — Joanna Pleszczynska
(74) *Attorney, Agent, or Firm* — Simpson & Simpson, PLLC

(57) ABSTRACT

This invention pertains to an impact protective composite material (10) for a flexible bulletproof garment. The impact protective composite material (10) includes a first element (20) that comprises a plurality of layers (20.1 to 20.*n*) formed from ultra-high molecular weight polyethylene and a second element (30) that comprises a layer formed from ultra-high molecular weight polyethylene, the second element being encased in polyurea.

20 Claims, 2 Drawing Sheets

(51) Int. Cl.

| | | |
|---|---|---|
| *B32B 3/04* | (2006.01) | |
| *B32B 5/18* | (2006.01) | |
| *B32B 5/24* | (2006.01) | |
| *B32B 5/26* | (2006.01) | |
| *B32B 27/06* | (2006.01) | |
| *B32B 27/32* | (2006.01) | |
| *F41H 5/04* | (2006.01) | |

(56) References Cited

U.S. PATENT DOCUMENTS

| 2009/0282596 A1 | 11/2009 | Carbajal et al. |
|---|---|---|
| 2012/0216669 A1 | 8/2012 | Bovenschen et al. |
| 2012/0270454 A1 | 10/2012 | Chiou et al. |
| 2020/0281292 A1 | 9/2020 | Wang |

* cited by examiner

IMPACT PROTECTIVE COMPOSITE MATERIAL

CROSS-REFERENCE TO RELATED APPLICATIONS

This application is the U.S. National Stage of International Application No. PCT/IB2021/055665, filed on Jun. 25, 2021, which application claims the benefit, under Articles 4 and 8 of the Stockholm Act of the Paris Convention for the Protection of Industrial Property, and priority to South African Pat. App. No 2020/06465, filed Oct. 19, 2020, each of which applications are incorporated herein by reference in their entireties.

FIELD OF THE INVENTION

This invention pertains to an impact protective composite material. More particularly, but not exclusively, this invention pertains to an impact protective composite material for a flexible bulletproof garment.

BACKGROUND TO THE INVENTION

Protective garments such as bulletproof vests that contain high strength fibres or material are known. Fibres used in the construction of these known bulletproof vests include aramid synthetic fibres such as poly (p-phenylene terephthalamide) and ultra-high molecular weight polyethylene.

The conventionally used aramid synthetic fibres or material are typically formed into layers by interlacing yarns of the synthetic fibres or sintering a powder of the synthetic material. These layers have high energy absorption properties and is also reasonably light in weight and flexible.

Overlying layers are typically incorporated into the structure of a bulletproof vest to provide a flexible bulletproof vest. These flexible bulletproof vests provide excellent stopping power to a ballistic threat. However, the known flexible bulletproof vests do not sufficiently protect a wearer thereof from suffering trauma from an impact of a ballistic threat. Trauma suffered by a wearer of the known flexible bulletproof vests include significant contusions and broken ribs or bones.

OBJECT OF THE INVENTION

It is an object of the present invention to provide an impact protective composite material for a flexible bulletproof garment with which the applicant believes the above disadvantage may at least be alleviated or which may provide a useful alternative to known impact protective composite materials for a bulletproof garment.

SUMMARY OF THE INVENTION

According to a first aspect of the invention there is provided an impact protective composite material including:
- a first element comprising a plurality of overlying layers formed from a material selected from the group consisting of meta-aramids, para-aramids, ultra-high molecular weight polyethylene, polyethylene terephthalate, cellulose, polyamide, a mixture of para-aramids and meta-aramids and a mixture of para-aramids and carbon, and a combination thereof; and
- a second element comprising a layer formed from a material selected from the group consisting of meta-aramids, para-aramids, ultra-high molecular weight polyethylene, polyethylene terephthalate, cellulose, polyamide, a mixture of para-aramids and meta-aramids and a mixture of para-aramids and carbon, and a combination thereof, the layer being encased in an elastomer.

The elastomer may be polyurea.

The layers of the first element and the second element may be formed by interlacing yarn of fibres selected from the group consisting of a meta-aramid fibre, a para-aramid fibre, an ultra-high molecular weight polyethylene fibre, a polyethylene terephthalate fibre, a cellulose fibre, a polyamide fibre, a mixture of para-aramid fibres and meta-aramid fibres and a mixture of para-aramid fibres and carbon fibres, and a combination thereof.

Alternatively, the layers of the first element and the second element may be formed by sintering a powder of a material selected form the group consisting of meta-aramids, para-aramids, ultra-high molecular weight polyethylene, polyethylene terephthalate, cellulose, polyamide, a mixture of para-aramids and meta-aramids and a mixture of para-aramids and carbon, and a combination thereof.

Preferably the layers comprise ultra-high molecular weight polyethylene that are formed into a layer having an area density of between $50\pm8$ gram per square metre ($g/m^2$) and $300\pm8$ gram per square metre ($g/m^2$). The ultra-high molecular weight polyethylene layers may each have a thickness of between $0.07\pm0.02$ millimetres (mm) and $0.40\pm0.02$ millimetres (mm).

The first element may comprise at least 14, preferably at least 24 ultra-high molecular weight layers. The plurality of ultra-high molecular weight layers may be grouped into sets, wherein a number of sets forms the first element. The ultra-high molecular weight layers of each set may be attached to one another. The second element may have a thickness of between 0.5 millimetre (mm) and 5 millimetres (mm).

The impact protective composite material may include a third element comprising a layer of high-density foam. The layer of high-density foam may have a thickness of between 1 millimetre (mm) and 7 millimetres (mm).

According to a second aspect of the invention, there is provided for the use of the impact protective composite material in a flexible bulletproof garment.

According to a third aspect of the invention, there is provided a flexible bulletproof garment which incorporates the impact protective composite material.

BRIEF DESCRIPTION OF THE DRAWINGS

The invention will now be described further, by way of example only, with reference to the accompanying drawings in which.

DETAILED DESCRIPTION OF THE INVENTION

Figure 1:
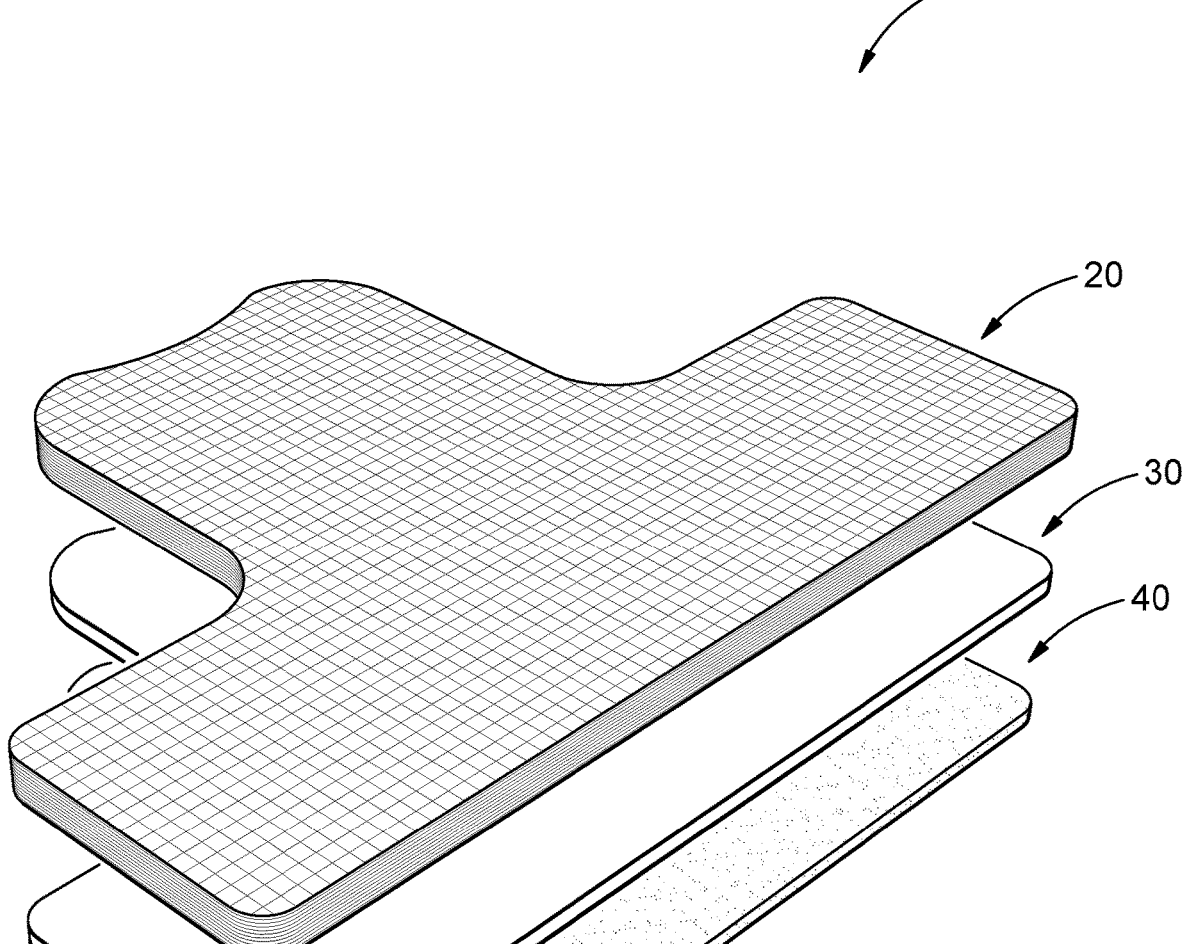
FIG. 1 is an exploded perspective view of an impact protective composite material according to the invention.
Figure 2:
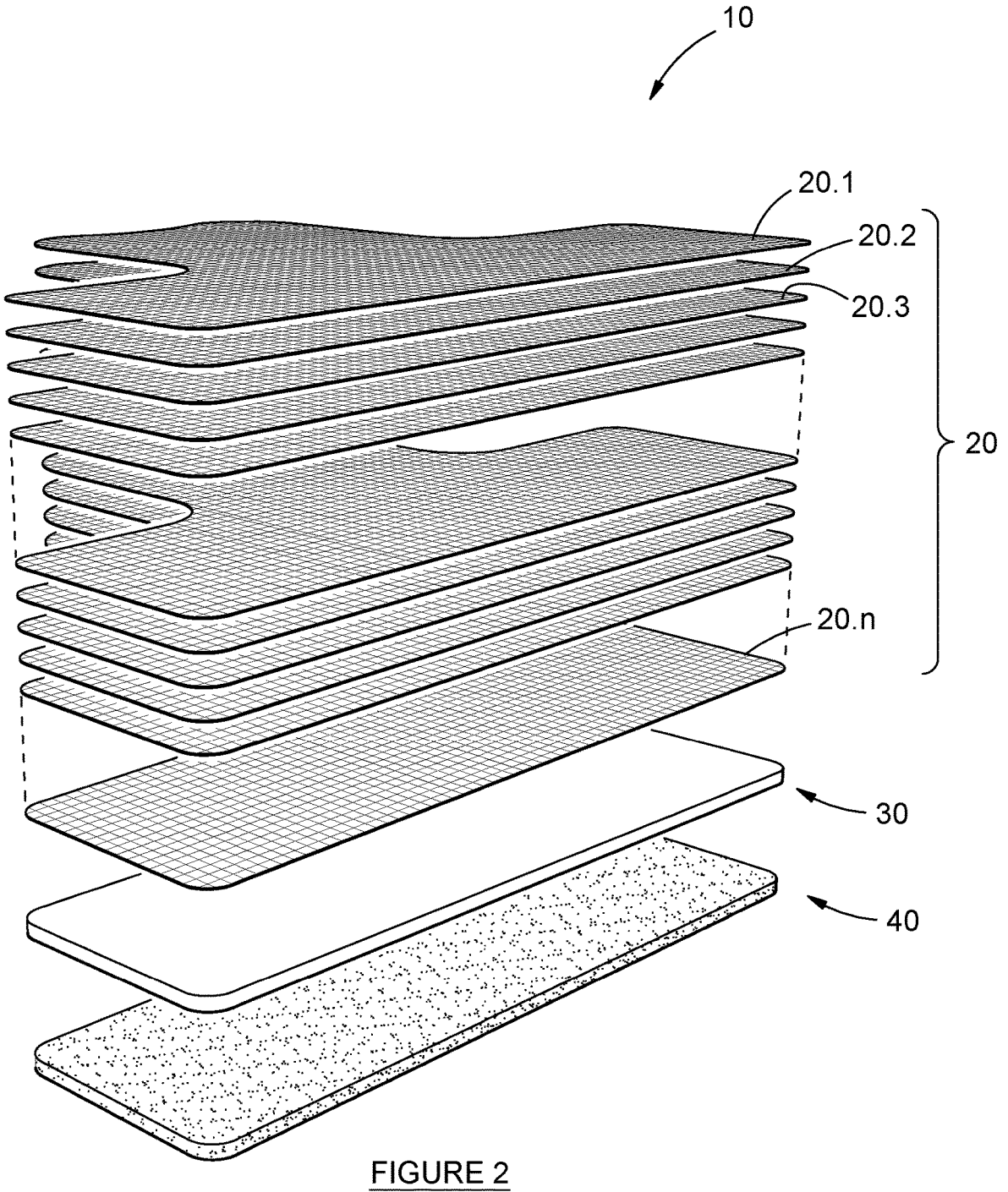
FIG. 2 is a second exploded perspective view of the impact protective composite according to the invention, showing an exploded view of a first element of the impact protective composite material.

With reference to the accompanying drawings, an impact protective composite material according to the invention is generally indicated by reference numeral 10.

The impact protective composite material 10 includes a first element 20, a second element 30 and a third element 40.

The first element 20 comprises a plurality of overlying ultra-high molecular weight polyethylene layers 22.1 to 22.n. Each of the ultra-high molecular weight polyethylene layers has an area density of approximately 160±8 grams per square metre (g/m²) and a thickness of approximately 0.21±0.02 millimetres.

The plurality of ultra-high molecular weight polyethylene layers 20.1 to 20.n are typically grouped into sets (not shown), where a number of sets form the first element 20. To form a set, a number of ultra-high molecular weight polyethylene layers are attached to one another at a peripheral region of each of the ultra-high molecular weight polyethylene layers forming the set. The number of ultra-high molecular weight polyethylene layers are typically stitched to one another at a peripheral region of each of the ultra-high molecular weight polyethylene layers. As an example, a first element 20 having 32 ultra-high molecular weight polyethylene layers are grouped into four sets, where each set comprises eight ultra-high molecular weight polyethylene layers.

The second element 30 comprises at least one ultra-high molecular weight polyethylene layer that is encased in polyurea. The polyurea encasing is the reaction product of an aromatic or aliphatic isocyanate component and a synthetic resin. The reaction product contains between 60% and 100% solids.

The second element 30 has a thickness of between 0.5 millimetre (mm) and 5 millimetres (mm). As an example, a polyurea layer having a thickness of approximately 0.5 millimetre (mm) may locate on each side of the ultra-high molecular weight polyethylene layer which is encased in polyurea. The polyurea which encases the ultra-high molecular weight polyethylene layer, surrounds the said ultra-high molecular weight polyethylene layer on all sides and around its edges.

The third element 40 comprises a layer of high-density foam. The layer of high-density foam typically has a thickness of between 1 millimetre (mm) and 7 millimetres (mm).

In use, the impact protective composite material 10 is incorporated into the structure of a flexible bulletproof vest, with the first element 20 forming the strike face. That is, the first element 20 is arranged in the flexible bulletproof vest to face an incoming ballistic threat.

The number of overlying ultra-high molecular weight polyethylene layers 20.1 to used in the first element 20 depends on the level of protection sought. As an example, for a Level II (as classified by the United States National Institute of Justice) bulletproof vest, the first element 20 will comprise between 14 and 26 overlying ultra-high molecular weight polyethylene layers. As a further example, for a Level IIIA (as classified by the United States National Institute of Justice), the first element 20 will comprise between 20 and 34 overlying ultra-high molecular weight polyethylene layers.

Advantageously, a bulletproof vest that incorporates the impact protective composite material 10 of the invention provides excellent stopping power to a ballistic threat and protection against trauma as the result of an impact of the ballistic threat. More particularly, the first element 20 provides the stopping power and the second element 30 provides the protection against trauma. Furthermore, the third element 40 and the flexibility of the sets forming the first element 20 provides for a comfortable bulletproof vest.

It is significant that a bulletproof vest that incorporates the impact protective composite material 10 provides the above-described protection whilst remaining flexible and light in weight. In this regard, a bulletproof vest that incorporates the impact protective composite material 10 is typically lighter in weight than conventional bulletproof vests that provide comparable protection against a ballistic threat.

Test Results which Showcase the Advantages of the Impact Composite Material 10.

Comparative test results which showcase the advantages of the impact protective composite material 10 are provided below.

All tests were performed by the South African Bureau of Standards ("SABS"). The tests were performed according to the prescriptions of South African National Standard 1658: 2007 entitled "Ballistic resistance of body armour" and was tested for level IIIA (as classified by the United States National Institute of Justice) ballistic resistance. South African National Standard 1658:2007 is based on the National Institute of Justice Standard 0101.04.

A bulletproof vest which incorporates the impact protective composite material 10 was compared to a bulletproof vest described and claimed in international application number PCT/162017/000572 entitled "Protective garments" (hereinafter "Comparative Bulletproof Vest"). The bulletproof vests tested were all sized "large" and so-called tactical bulletproof vests. That is, the bulletproof vests which were tested were not concealed bulletproof vests which are meant to be worn underneath the clothes of a wearer.

The Comparative Bulletproof Vest which was used during the tests weighed 5.9 kilogram and comprised:

40 overlying ultra-high molecular weight polyethylene layers;
overlying steel mesh layers; and
1 high-density foam layer.

The tests were performed on a 5-metre range. An average temperature of 23.4 degrees Celsius (° C.) and a relative humidity of 38% were recorded.

Results of tests performed on the Comparative Bulletproof Vest:

| Calibre of firearm and ammunition used in test | | .44 Remington Magnum shooting semi-jacketed hollo-point ammunition |
|---|---|---|
| Shot | Angle | Velocity (metres/second) | having a nominal mass of 15.6 gram Back Face Signature (millimetres) |
| 1 | 0 | 434.48 | 30.60 |
| 2 | 0 | 436.93 | 23.90 |
| 3 | 0 | 438.48 | 36.00 |
| 4 | 30 | 437.98 | 8.20 |
| 5 | 30 | 432.64 | 15.10 |
| 6 | 0 | 439.43 | 37.90 |
| Average back face signature (i.e., deformation) | | | 25.28 |

| Calibre of firearm and ammunition used in test | | 9 mm shooting full metal jacketed round nose ammunition |
|---|---|---|
| Shot | Angle | Velocity (metres/second) | having a nominal mass of 8 gram Back Face Signature (millimetres) |
| 1 | 0 | 433.54 | 15.90 |
| 2 | 0 | 430.78 | 11.70 |
| 3 | 0 | 427.66 | 6.60 |
| 4 | 30 | 427.81 | 6.40 |
| 5 | 30 | 436.17 | 4.90 |
| 6 | 0 | 442.54 | 14.80 |
| Average back face | | | 10.05 |

-continued

| Calibre of firearm and ammunition used in test | | | 9 mm shooting full metal jacketed round nose ammunition |
| Shot | Angle | Velocity (metres/second) | having a nominal mass of 8 gram Back Face Signature (millimetres) |
| --- | --- | --- | --- |
| signature (i.e., deformation) | | | |

Below follows the results of tests performed on a first version of a bulletproof vest incorporating the impact protective composite material 10. This first version of the bulletproof vest weighed 4.8 kilogram and comprised:

32 overlying ultra-high molecular weight polyethylene layers; and one ultra-high molecular weight polyethylene layer encased in polyurea.

1 high-density foam layer.

| Calibre of firearm and ammunition used in test | | | .44 Remington Magnum shooting semi-jacketed hollo-point ammunition |
| Shot | Angle | Velocity (metres/second) | having a nominal mass of 15.6 gram Back Face Signature (millimetres) |
| --- | --- | --- | --- |
| 1 | 0 | 440.02 | 37.80 |
| 2 | 0 | 434.31 | 18.00 |
| 3 | 0 | 434.42 | 17.10 |
| 4 | 30 | 434.95 | 0.60 |
| 5 | 30 | 437.77 | 11.90 |
| 6 | 0 | 435.62 | 20.10 |
| Average back face signature (i.e., deformation) | | | 17.58 |

| Calibre of firearm and ammunition used in test | | | 9 mm shooting full metal jacketed round nose ammunition |
| Shot | Angle | Velocity (metres/second) | having a nominal mass of 8 gram Back Face Signature (millimetres) |
| --- | --- | --- | --- |
| 1 | 0 | 433.69 | 19.00 |
| 2 | 0 | 438.87 | 14.50 |
| 3 | 0 | 441.58 | 8.90 |
| 4 | 30 | 440.74 | 0.00 |
| 5 | 30 | 433.92 | 1.20 |
| 6 | 0 | 436.93 | 7.10 |
| Average back face signature (i.e., deformation) | | | 8.45 |

Below follows the results of tests performed on a second version of a bulletproof vest incorporating the impact protective composite material 10. This second version of the bulletproof vest weighed 3.7 kilogram and comprised:

24 overlying ultra-high molecular weight polyethylene layers; and one ultra-high molecular weight polyethylene layer encased in polyurea.

1 high-density foam layer.

| Calibre of firearm and ammunition used in test | | | .44 Remington Magnum shooting semi-jacketed hollo-point ammunition |
| Shot | Angle | Velocity (metres/second) | having a nominal mass of 15.6 gram Back Face Signature (millimetres) |
| --- | --- | --- | --- |
| 1 | 0 | 435.79 | 35.71 |
| 2 | 0 | 430.48 | 30.80 |
| 3 | 0 | 434.59 | 31.47 |

-continued

| Calibre of firearm and ammunition used in test | | | .44 Remington Magnum shooting semi-jacketed hollo-point ammunition |
| Shot | Angle | Velocity (metres/second) | having a nominal mass of 15.6 gram Back Face Signature (millimetres) |
| --- | --- | --- | --- |
| 4 | 30 | 431.31 | 16.84 |
| 5 | 30 | 431.37 | 15.57 |
| 6 | 0 | 433.65 | 17.51 |
| Average back face signature (i.e., deformation) | | | 24.65 |

| Calibre of firearm and ammunition used in test | | | 9 mm shooting full metal jacketed round nose ammunition |
| Shot | Angle | Velocity (metres/second) | having a nominal mass of 8 gram Back Face Signature (millimetres) |
| --- | --- | --- | --- |
| 1 | 0 | 371.03 | 22.16 |
| 2 | 0 | 366.03 | 17.66 |
| 3 | 0 | 368.69 | 18.73 |
| 4 | 30 | 374.77 | 13.74 |
| 5 | 30 | 363.51 | 10.13 |
| 6 | 0 | 375.14 | 15.62 |
| Average back face signature (i.e., deformation) | | | 16.34 |

As is clear from the above test results, a bulletproof vest which incorporates the impact protective composite material 10 is not only lighter in weight, but also has a significantly lower average back face signature (i.e., deformation) than the Comparative Bulletproof Vest. The significantly lower average back face signature (i.e., deformation) of a bulletproof vest incorporating the impact protective composite material 10 lessens trauma suffered from an impact of a ballistic threat by a wearer of the bulletproof vest.

It will be appreciated by those skilled in the art that the invention is not limited to the precise details as described herein and that many variations are possible without departing from the scope of the invention. As an example, the impact protective composite material 10 described herein is suitable for any flexible impact protective garment, not only bulletproof vests.

The description is presented by way of example only in the cause of providing what is believed to be the most useful and readily understood description of the principles and conceptual aspects of the invention. In this regard, no attempt is made to show more detail than is necessary for a fundamental understanding of the invention. The words which have been used herein are words of description and illustration, rather than words of limitation.

The invention claimed is:

1. A lightweight and flexible impact protective composite material having a strike face side and a back face side, the lightweight and flexible protective composite material comprising, in order from the strike face side to the back face side:

a strike face side first element comprising a plurality of overlying layers formed from a material selected from the group consisting of: meta-aramids, para-aramids, ultra-high molecular weight polyethylene, polyethylene terephthalate, cellulose, polyamide, a mixture of para-aramids and meta-aramids and a mixture of para-aramids and carbon, and a combination thereof, each layer of the plurality of overlying layers forming the strike face side first element all formed by interlaced yarns of fibers, or each layer of the plurality of overlying layers forming the strike face side first element all formed by sintering; and a back face side second element comprising a back face layer formed from a material selected from the group consisting of: meta-aramids, para-aramids, ultra-high molecular weight polyethylene, polyethylene terephthalate, cellulose, polyamide, a mixture of para-aramids and meta-aramids and a mixture of para-aramids and carbon, and a combination thereof, the back face layer being formed by interlaced yarns of fibers or by sintering, the back face layer encased in an elastomer on all sides, wherein each layer of the plurality of layers of the strike face side first element or the back face layer of the back face side second element comprises ultra-high molecular weight polyethylene having an area density of between 50±8 grams per square meter (g/m²) and 300±8 grams per square meter (g/m²) and a thickness of between 0.07±0.02 millimeters (mm) and 0.40±0.02 millimeters (mm).

2. The lightweight and flexible impact protective composite material of claim 1, wherein the elastomer is polyurea.

3. The lightweight and flexible impact protective composite material of claim 1, wherein the layers of the strike face side first element and the back face side second element are formed by interlacing yarn of fibres selected from the group consisting of a meta-aramid fibre, a para-aramid fibre, an ultra-high molecular weight polyethylene fibre, a polyethylene terephthalate fibre, a cellulose fibre, a polyamide fibre, a mixture of para-aramid fibres and meta-aramid fibres and a mixture of para-aramid fibres and carbon fibres, and a combination thereof.

4. The lightweight and flexible impact protective composite material of claim 1, wherein the layers of the strike face side first element and the back face side second element are formed by sintering a powder of a material selected form the group consisting of meta-aramids, para-aramids, ultra-high molecular weight polyethylene, polyethylene terephthalate, cellulose, polyamide, a mixture of para-aramids and meta-aramids and a mixture of para-aramids and carbon, and a combination thereof.

5. The lightweight and flexible impact protective composite material of claim 1, wherein the strike face side first element comprises at least 14 ultra-high molecular weight polyethylene layers.

6. The lightweight and flexible impact protective composite material of claim 1, wherein the strike face side first element comprises between 14 and 26 ultra-high molecular weight polyethylene layers.

7. The lightweight and flexible impact protective composite material of claim 1, wherein a plurality of ultra-high molecular weight polyethylene layers is grouped into sets, wherein a number of sets forms the strike face side first element.

8. The lightweight and flexible impact protective composite material of claim 7, wherein the ultra-high molecular weight polyethylene layers of each set are attached to one another.

9. The lightweight and flexible impact protective composite material of claim 1, wherein the back face side second element has a thickness of between 0.5 millimetre (mm) and 5 millimetres (mm).

10. The lightweight and flexible impact protective composite material of claim 1, wherein the impact protective composite material includes a third element comprising a layer of high-density foam.

11. The lightweight and flexible impact protective composite material of claim 10, wherein the layer of high-density foam has a thickness of between 1 millimetre (mm) and 7 millimetres (mm).

12. Use of the lightweight and flexible impact protective composite material of claim 1 in a flexible bulletproof garment.

13. A lightweight and flexible bulletproof garment which incorporates the impact protective composite material of claim 1.

14. A lightweight and flexible impact protective composite material having a strike face side and a back face side, the lightweight and flexible protective composite material consisting essentially of, in order from the strike face side to the back face side:

a strike face side first element comprising a plurality of overlying layers formed from a material selected from the group consisting of: meta-aramids, para-aramids, ultra-high molecular weight polyethylene, polyethylene terephthalate, cellulose, polyamide, a mixture of para-aramids and meta-aramids and a mixture of para-aramids and carbon, and a combination thereof, each layer of the plurality of overlying layers forming the strike face side first element all formed by interlaced yarns of fibers, or each layer of the plurality of overlying layers forming the strike face side first element all formed by sintering; and a back face side second element comprising a back face layer formed from a material selected from the group consisting of: meta-aramids, para-aramids, ultra-high molecular weight polyethylene, polyethylene terephthalate, cellulose, polyamide, a mixture of para-aramids and meta-aramids and a mixture of para-aramids and carbon, and a combination thereof, the back face layer being formed by interlaced yarns of fibers or by sintering, the back face layer encased in an elastomer on all sides, wherein each layer of the plurality of layers of the strike face side first element or the back face layer of the back face side second element comprises ultra-high molecular weight polyethylene having an area density of between 50±8 grams per square meter (g/m²) and 300±8 grams per square meter (g/m²) and a thickness of between 0.07±0.02 millimeters (mm) and 0.40±0.02 millimeters (mm).

15. The lightweight and flexible impact protective composite material of claim 14, wherein the elastomer is polyurea.

16. The lightweight and flexible impact protective composite material of claim 14, wherein the layers of the strike face side first element and the back face side second element are formed by interlacing yarn of fibres selected from the group consisting essentially of: a meta-aramid fibre, a para-aramid fibre, an ultra-high molecular weight polyethylene fibre, a polyethylene terephthalate fibre, a cellulose fibre, a polyamide fibre, a mixture of para-aramid fibres and meta-aramid fibres and a mixture of para-aramid fibres and carbon fibres, and a combination thereof.

17. The lightweight and flexible impact protective composite material of claim 14, wherein the layers of the strike face side first element and the back face side second element are formed by sintering a powder of a material selected form the group consisting essentially of: meta-aramids, para-aramids, ultra-high molecular weight polyethylene, polyethylene terephthalate, cellulose, polyamide, a mixture of para-aramids and meta-aramids and a mixture of para-aramids and carbon, and a combination thereof.

18. The lightweight and flexible impact protective composite material of claim 14, wherein the strike face side first element comprises at least 14 ultra-high molecular weight polyethylene layers.

19. The lightweight and flexible impact protective composite material of claim 14, wherein the strike face side first element comprises between 14 and 26 ultra-high molecular weight polyethylene layers.

20. The lightweight and flexible impact protective composite material of claim 14, wherein the back face side second element has a thickness of between 0.5 millimetre (mm) and 5 millimetres (mm).

* * * * *